(12) United States Patent
Keal

(10) Patent No.: US 12,360,503 B2
(45) Date of Patent: Jul. 15, 2025

(54) LIGHT FIXTURE OF BUILDING AUTOMATION SYSTEM

(71) Applicant: Building Robotics, Inc., Oakland, CA (US)

(72) Inventor: William Kerry Keal, San Jose, CA (US)

(73) Assignee: Building Robotics, Inc., Santa Clara, CA (US)

( * ) Notice: Subject to any disclaimer, the term of this patent is extended or adjusted under 35 U.S.C. 154(b) by 641 days.

(21) Appl. No.: 17/002,416

(22) Filed: Aug. 25, 2020

(65) Prior Publication Data

US 2022/0066407 A1    Mar. 3, 2022

(51) Int. Cl.

| | |
|---|---|
| G05B 19/042 | (2006.01) |
| F21V 23/04 | (2006.01) |
| G01S 3/46 | (2006.01) |
| H04B 17/318 | (2015.01) |
| H04Q 9/00 | (2006.01) |
| H04W 4/021 | (2018.01) |
| H04W 4/06 | (2009.01) |
| F21Y 115/10 | (2016.01) |

(52) U.S. Cl.
CPC .......... *G05B 19/042* (2013.01); *F21V 23/045* (2013.01); *G01S 3/46* (2013.01); *H04B 17/318* (2015.01); *H04Q 9/00* (2013.01); *H04W 4/021* (2013.01); *H04W 4/06* (2013.01); *F21Y 2115/10* (2016.08); *G05B 2219/25011* (2013.01); *G05B 2219/2614* (2013.01); *H04Q 2209/40* (2013.01)

(58) Field of Classification Search
CPC ....... H04W 4/33; H04W 4/38; F21Y 2115/10; F21Y 23/045; F21Y 2103/00; H01Q 1/12
See application file for complete search history.

(56) References Cited

U.S. PATENT DOCUMENTS

| | | | |
|---|---|---|---|
| 5,488,677 A | * | 1/1996 | Tokano ................ G01R 15/241 385/3 |
| 8,422,889 B2 | | 4/2013 | Jonsson |
| 9,332,621 B2 | | 5/2016 | Sagal et al. |
| 9,672,396 B1 | | 6/2017 | Bookman |
| 9,832,833 B1 | * | 11/2017 | Pipe-Mazo ............ H05B 47/19 |
| 10,129,960 B2 | | 11/2018 | Earl et al. |
| 10,346,657 B1 | * | 7/2019 | White ................ G06K 7/10099 |
| 10,487,990 B2 | | 11/2019 | Gielen et al. |

(Continued)

FOREIGN PATENT DOCUMENTS

| | | | | |
|---|---|---|---|---|
| CN | 204285167 U | * | 4/2015 | |
| CN | 112113193 A | * | 12/2020 | ............... F21S 4/26 |

(Continued)

OTHER PUBLICATIONS

PCT Search Report dated Oct. 21, 2021, for PCT Application No. PCT/US2021/038572, 14 pages.

*Primary Examiner* — Vincent H Tran

(57) ABSTRACT

There is described a building automation system comprising a mobile tag, sensor devices, and a sensor hub. The mobile tag transmits a broadcast beacon based on RF technology. The sensor devices are co-located with light fixtures and include antennas for receiving a broadcast beacon. The sensor devices generate signals associated with the broadcast beacon received by the antennas. The sensor hub receives the signals from each sensor device and determines a location of the mobile tag based on the signals.

3 Claims, 8 Drawing Sheets

(56) References Cited

U.S. PATENT DOCUMENTS

| | | | |
|---|---|---|---|
| 10,544,907 B2 | 1/2020 | Cairns et al. | |
| 10,687,406 B2 | 6/2020 | Nimmer | |
| 10,848,906 B2* | 11/2020 | Whitten | H04W 4/50 |
| 2008/0035847 A1* | 2/2008 | Honda | G01J 5/061 |
| | | | 250/338.4 |
| 2008/0252462 A1* | 10/2008 | Sakama | G06K 19/07749 |
| | | | 340/572.7 |
| 2011/0270420 A1* | 11/2011 | Tabor | G05B 19/0428 |
| | | | 700/12 |
| 2011/0272470 A1* | 11/2011 | Baba | G06K 19/027 |
| | | | 235/492 |
| 2012/0261576 A1* | 10/2012 | Tomioka | B82Y 20/00 |
| | | | 250/495.1 |
| 2013/0241699 A1* | 9/2013 | Covaro | G06Q 10/0875 |
| | | | 340/10.1 |
| 2015/0138027 A1* | 5/2015 | Miller, II | H01Q 9/0442 |
| | | | 343/723 |
| 2015/0206040 A1* | 7/2015 | Klehr | G06K 19/07771 |
| | | | 235/492 |
| 2015/0270597 A1 | 9/2015 | Kough et al. | |
| 2016/0290578 A1* | 10/2016 | Adkins | F21K 9/232 |
| 2018/0077523 A1* | 3/2018 | Herrera | H05B 47/19 |
| 2018/0248623 A1 | 8/2018 | Ryan et al. | |
| 2018/0249297 A1 | 8/2018 | Taylor | |
| 2019/0114451 A1 | 4/2019 | Armstrong | |
| 2019/0174608 A1 | 6/2019 | Verfuerth | |
| 2019/0181545 A1* | 6/2019 | Lu | H05B 47/19 |
| 2019/0215935 A1* | 7/2019 | Trublowski | H01Q 9/0407 |
| 2019/0257486 A1* | 8/2019 | Hiramatsu | F21S 8/081 |
| 2019/0312346 A1* | 10/2019 | Wang | H01Q 1/246 |
| 2020/0011959 A1* | 1/2020 | Abou-Rizk | G01S 5/0289 |
| 2020/0196093 A1 | 6/2020 | Wendt et al. | |
| 2020/0209928 A1* | 7/2020 | Tsai | H01Q 7/00 |
| 2020/0341567 A1* | 10/2020 | Lin | G02F 1/133308 |
| 2021/0095841 A1* | 4/2021 | Kulkarni | F21V 23/045 |
| 2021/0194685 A1* | 6/2021 | Patel | H04W 12/06 |
| 2022/0334245 A1* | 10/2022 | Baur | H01Q 1/3233 |

FOREIGN PATENT DOCUMENTS

| | | | | |
|---|---|---|---|---|
| JP | 2006080007 A | * | 3/2006 | F21V 11/02 |
| WO | WO-2015114688 A1 | * | 8/2018 | G06F 1/1626 |

* cited by examiner

LIGHT FIXTURE OF BUILDING AUTOMATION SYSTEM

FIELD OF THE INVENTION

This application relates to the field of building automation systems and, more particularly, to light fixtures managed by building automation systems.

BACKGROUND

Building automation systems encompass a variety of devices and components that aid in the monitoring and control of various aspects of building operation. The systems may include one or more subsystems for managing operations, such as security, fire safety, lighting, and/or heating, ventilation, and air conditioning ("HVAC"). The devices and components of the system may be widely dispersed throughout a facility or campus.

Building automation systems may provide "intelligence" about building occupants to facilitate control of the building equipment. That is, based on behavior or predicted behavior of users within the building, the system may provide building operators and maintenance personnel with enhanced environmental, safety, logistical, and/or information control. Such user behavior may include the location of people within particular areas of a building, which may be utilized by the building management system to enhance control of the environmental conditions of the building.

Building automation systems may include sensors to receive communications and detect environmental conditions. For example, each sensor may include a communication circuit and a corresponding antenna to receive wireless signals from broadcasting devices. A central server may collect the signals from the sensors and determine locations of people or assets corresponding to the devices. The sensors and their antennas should be positioned a foot apart or more for better determinations. By collecting several different measurements with sensors at distal positions, the location of a person or asset may be determined.

SUMMARY

There is provided a light fixture configuration for building automation systems. Each light fixture of the building automation system includes a communication component for receiving a broadcast beacon from a mobile tag associated with a person or other type of asset and a sensor for processing the received broadcast beacon. The building automation system may determine a location of the mobile tag based on angle of arrival or other location determination techniques of the broadcast beacons received. Thus, each light fixture includes multiple antennas that are configured or positioned distal from each other at certain areas of the light fixture. For embodiments that apply an angle of arrival technique, the system measures the time difference between signals received at different antennas of the light fixture. These measurements correlate to the angle of arrival of the signals received by the antennas of the light fixture. With several different measurements for light sensors in different locations, the system may determine the location of the mobile tag. In addition, the antennas of each light fixture are positioned in specific directions and/or positions so that they are less noticeable and more aesthetically pleasing than conventional antennas.

One aspect is a light fixture comprising a light fixture housing, a lamp and multiple antennas supported by the light fixture housing, and a sensor component coupled to the antennas. The lamp has an elongated structure and includes multiple semiconductor light sources. A first antenna of the multiple antennas is directed toward a first end of the light fixture housing, and a second antenna of the multiple antennas is directed toward a second end of the light fixture housing. The sensor component processes RF signals received from a remote device by the antennas.

Another aspect is a building automation system comprising a mobile tag, multiple sensor device co-located with multiple light fixtures, and a sensor hub. The mobile tag is configured to transmit a broadcast beacon based on RF technology. Each sensor device includes multiple antennas to receive the broadcast beacon and generate at least one signal associated with the broadcast beacon received by the multiple antennas. The sensor hub is configured to receive the signal(s) from each sensor device and determine a location of the mobile tag based on the signal(s).

Yet another aspect is a method of a building automation system. A broadcast beacon is transmitted, based on RF technology, from a mobile tag. The broadcast beacon is received at multiple antennas of each sensor device of multiple sensor devices, in which the sensor devices are co-located with multiple light fixtures. One or more signals associated with the broadcast beacon, received at multiple antennas, are generated at each sensor device. The signal or signals from each sensor device are received at a sensor hub. A location of the mobile tag based on the signal(s) is determined at the sensor hub.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
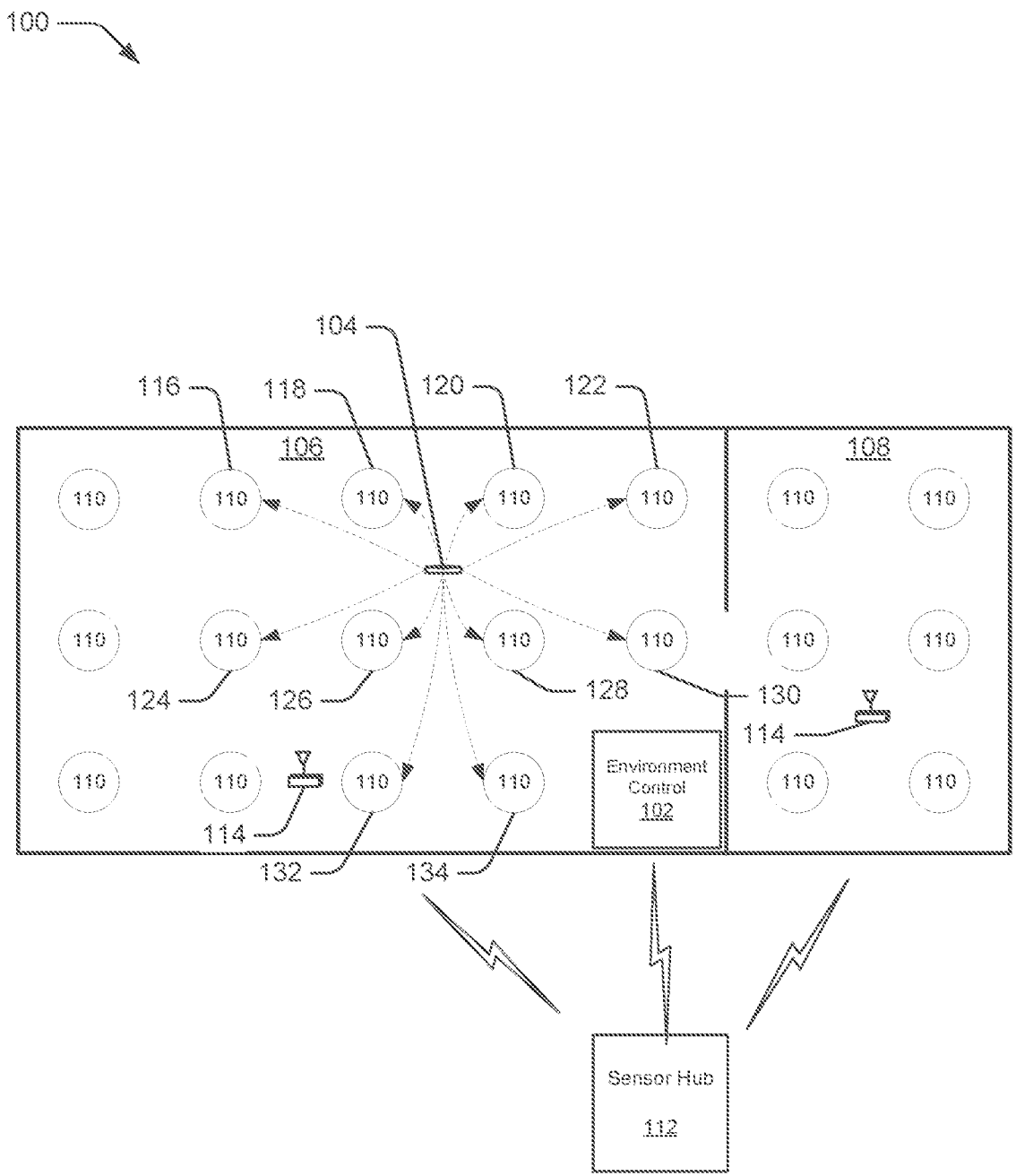
FIG. 1 is an illustration of an environment in an example implementation that is operable to employ techniques described herein.

Various technologies that pertain to light fixtures and their associated building automation systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The building automation system determines a characteristic of a mobile tag, such as its location, based on angle of arrival, time of flight, or other location determination techniques of the broadcast beacons received from the mobile tag. The system, whether at the light fixture or at a remote device of the system, measures the time difference between the signal reaching one antenna of the light fixture compared to another antenna of the light fixture and correlate them to the signal measurements received by the antennas of the light fixture. The system determines the mobile tag characteristic based on the location determination technique of the antennas and may further consider other measurements for sensors and antennas at different locations.

The antennas of each light fixture are positioned in specific directions and/or positions so that they are hidden, thus more aesthetically pleasing than conventional antennas. In particular, the antennas of the light fixture are elongated and distal from each other to maximize performance while positioned within the structure of the light fixture to be less noticeable than other configurations of antennas. The elongated antennas may be positioned strategically within a lamp, along side a lamp, or otherwise in alignment with the lamp in order to maximize the aesthetics of the light fixture. For example, the antennas may be positioned at the light fixture so that they are "hidden" from the view of proximal building occupants by one or more components and/or by the brightness of the light sources of the light fixture.

Referring to FIG. 1, a system 100 provides information to an environment control 102 of the facility so that the environment control may manage one or more environmental conditions of the facility. The environment control may manage the environmental conditions based at least in part on the locations of mobile tags 104, and an occupant or asset associated with the mobile tag.

The system 100 includes an infrastructure 110, 112, 114 to establish locations of one or more mobile tags 104 within a facility, such as an indoor structure or defined space. The facility may include various partitioned or designated areas 106, 108 of the facility, such as floors, rooms, hallways, or defined open areas associated with the facility. Each area 106, 108 of the facility may include devices of the infrastructure such as one or more sensor devices 110. For some embodiments, a sensor hub 112 of the infrastructure may be co-located with some or all sensor devices within an area 106, 108 of the facility but, for other embodiments, the sensor hub may be remote from the sensor devices and/or the facility. For example, the sensor hub 112 may be located in the Cloud and communicate directly or indirectly with the sensor devices 110, at least in part, via the Internet or other communication network. The sensor hub 112 communicates directly or indirectly with the sensor devices 110 and the interconnection between the sensor hub 112 and the sensor devices may include wired and/or wireless connections. For example, the system 100 may optionally include wired or wireless gateways 114 positioned among the sensor devices 110 at the facility in which the wired or wireless gateways may be part of the sensor hub 112 or serve as a communication transponder or transponders between the sensor hub 112 and the sensor devices. Similar to the sensor devices 110 and the sensor hub 112, the gateways 114 may also process data to employ techniques described herein.

The sensor devices 110 of the infrastructure may be positioned at fixed locations throughout the area. The sensor devices 110 may be evenly distributed throughout each area 106, 108 or selectively distributed in a non-even manner, as may be preferred for mobile tag detection. The sensor devices 110 are configured to detect beacons broadcast by one or more sources associated with positions of occupants. In particular, occupants may carry the mobile tags 104 for detection by the sensor devices 110, among other purposes, to facilitate location detection of the devices. Each of the mobile tags 104 may be any type of transportable device capable of wireless communication with sensor devices 110 of the facility. Examples of mobile tags 104 include, but are not limited to, badges, wearables, mobile devices, tablets, portable computing devices, and any other type of transportable device including circuitry for transmitting a beacon.

A mobile tag 104 may broadcast a beacon to sensor devices 116-134 in proximity to the device. For the example shown in FIG. 1, the broadcast beacon transmitted by the mobile tag 112 may be received by the sensor devices 118, 120, 126, 128 located closest to the device. Also, for this example, the broadcast beacon may be received by other sensor devices 116, 122, 124, 130-134, in addition to the closest sensor devices 118, 120, 126, 128, in proximity to the mobile tag 112. The broadcast range of the mobile tag 112 for transmitting the broadcast beacon may be limited by the capabilities of the device, such as power and energy storage, as well as the proximity of the device to the sensor devices 110 in view of distance and any obstructions therebetween.

For at least some embodiments, the system 100 may manage one or more environment controls 102 associated with the facility based on the determined locations of the mobile tags 104. In particular, the sensor hub 112 may provide control signals to an environment control 102 via a wired connection, wireless connection, or a combination of wired and wireless connections. The environment control 102 may manages an environmental condition of the facility based, in whole or in part, on the locations corresponding to the mobile tags. Environmental conditions managed by the environment control 102 include, but are not limited to, heating ventilation air conditioning ("HVAC") conditions, lighting conditions, safety conditions, and security conditions. For example, areas of the facility where occupants are not detected may have lights dimmed or inactivated. Also, an HVAC system associated with a particular area may adjust ambient temperatures based on the occupancy and/or location of occupants as detected by the system 100.

Figure 2:
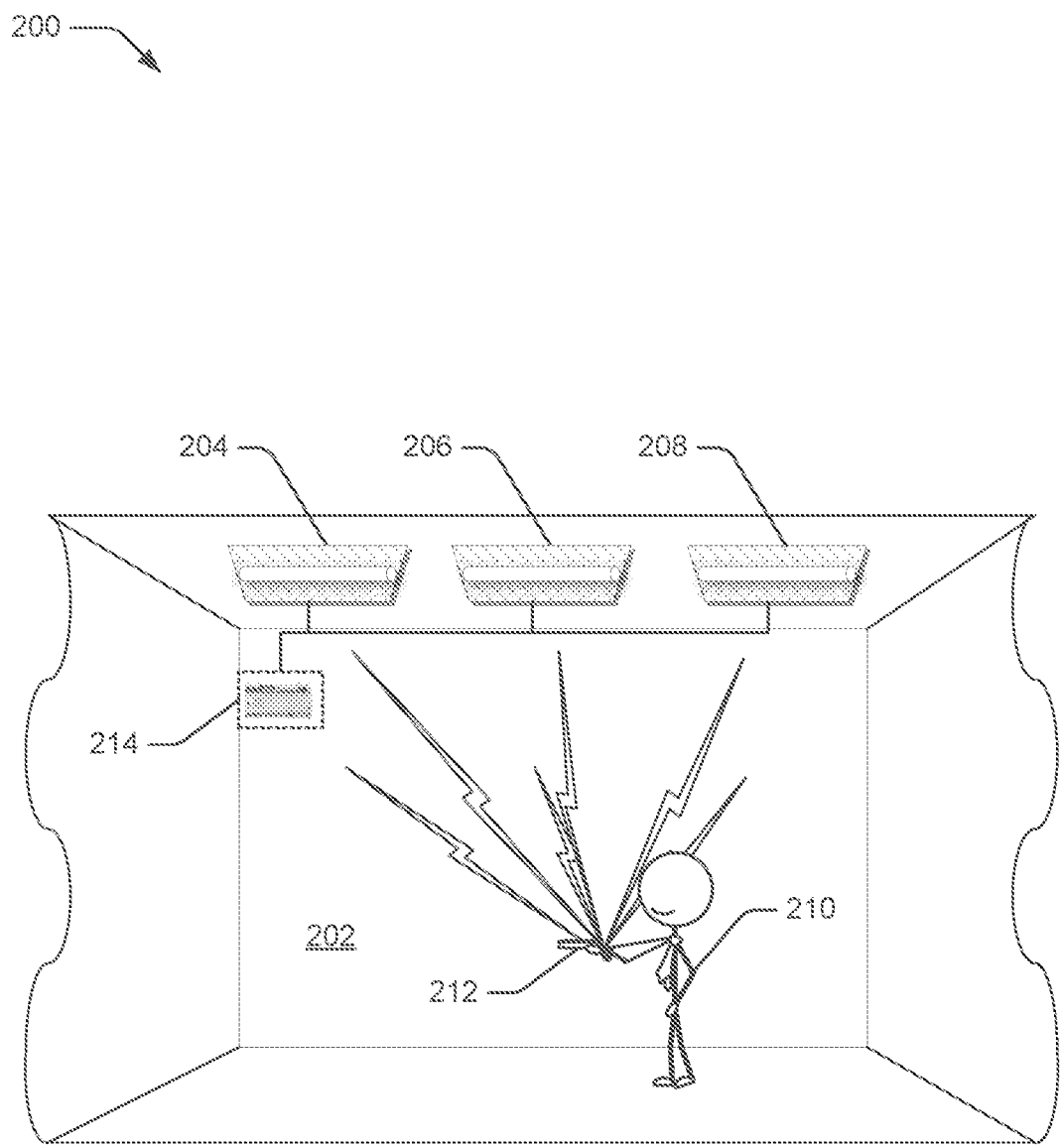
FIG. 2 a cut-away, side planar view of an example area illustrating an aspect of the system described herein.

Referring to FIG. 2, there is shown an example implementation 200 as applied to an area 202 of the facility to illustrate an aspect of the system 100. For the example implementation 200, environmental devices, such as light fixtures 204-208, are installed at ceiling of the area 202. Examples of environmental devices include, but are not limited to, light fixtures 204-208, air vents, window blinds/shades, smoke detectors, security cameras, and the like. The example implementation 200 also shows an asset 210 of the facility, such as an occupant, and a mobile tag 212 associated with the asset. For example, the mobile tag 212 may be carried, supported, or otherwise co-located with the asset 210 such that the location of the mobile tag may be associated with the location of the asset. The system 100 may also include one or more wired or wireless gateways 214 positioned among the light fixtures 204-208 at the facility in which each wired or wireless gateway may be part of the sensor hub 112 or serve as a communication transponder between the sensor hub and sensor devices of some or all light fixtures.

The building automation system may determine a location of the mobile tag 212 based on a location determination technique of the broadcast beacons transmitted by the mobile tag, such as angle or arrival or time of flight techniques. For example, regarding angle of arrival, the system 100 may measure the time difference between signals received at different antennas of the light fixture 204-208, and the measurements correlate to the angle of arrival of the signals received by the antennas of the light fixture. To determine the mobile tag location using the angle, the system 100 determines (actually or virtually) a shape that extends from each antenna that corresponds to the measured angle. The determination is performed for different antennas that pickup a broadcast beacon of the mobile tag 212 and, with three or more measured angles, the system 100 may determine an intersection point corresponding to the source location of the beacon. For some embodiments. the sensor devices of the light fixtures 204-208 may communicate with each other or other devices. Thus, the sensor devices may send measurements to sensor devices of other light fixtures or the data may be provided to other devices of the system 100 (such as the sensor hub 112 or gateway 114) to determine the location of the mobile tag 212. For some embodiments, the location or measured angles may be transmitted back to one or more mobile tags 212 so that a mobile tag of the system may determine the location.

Figure 3A:
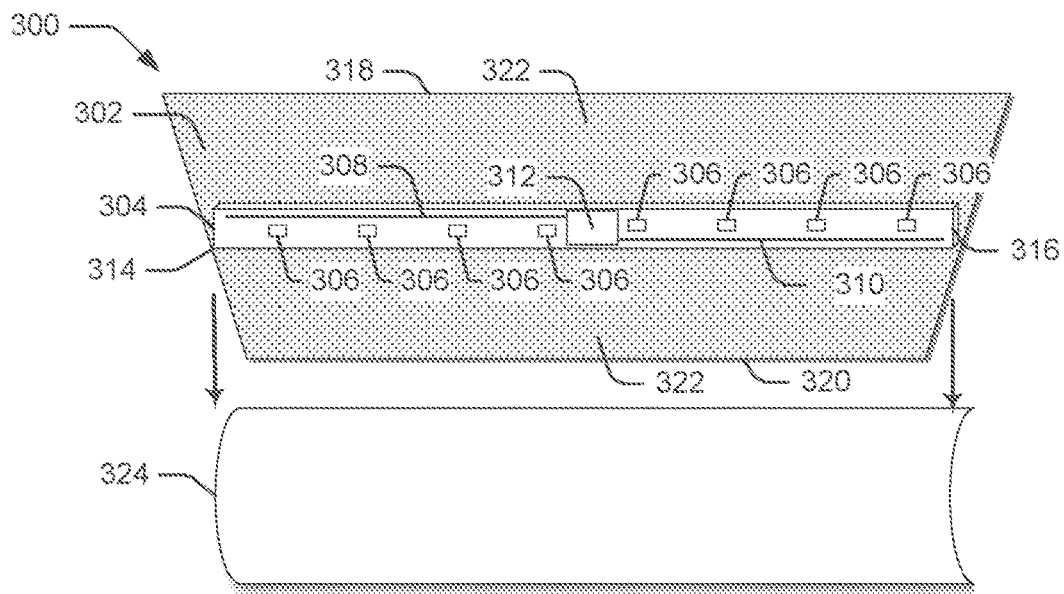
FIGS. 3A-3C are structural representations illustrating example implementations of the light fixtures of FIG. 1.
Figure 3B:
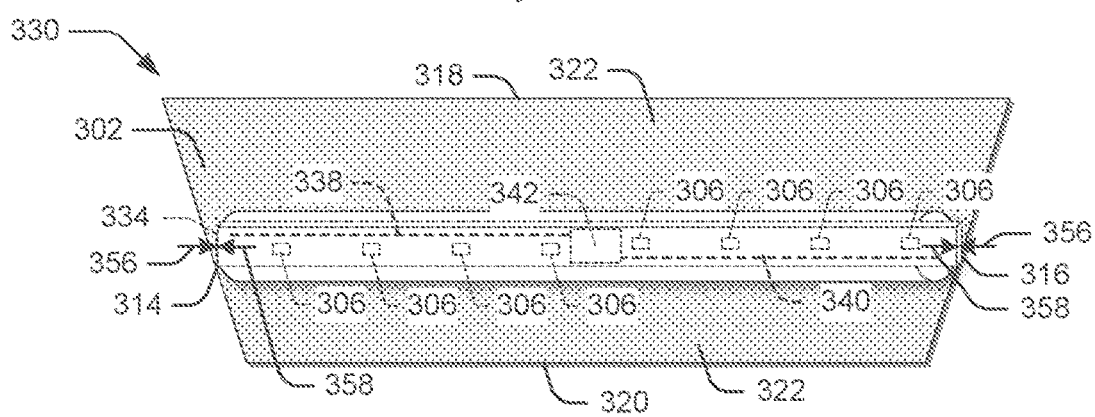
Figure 3C:
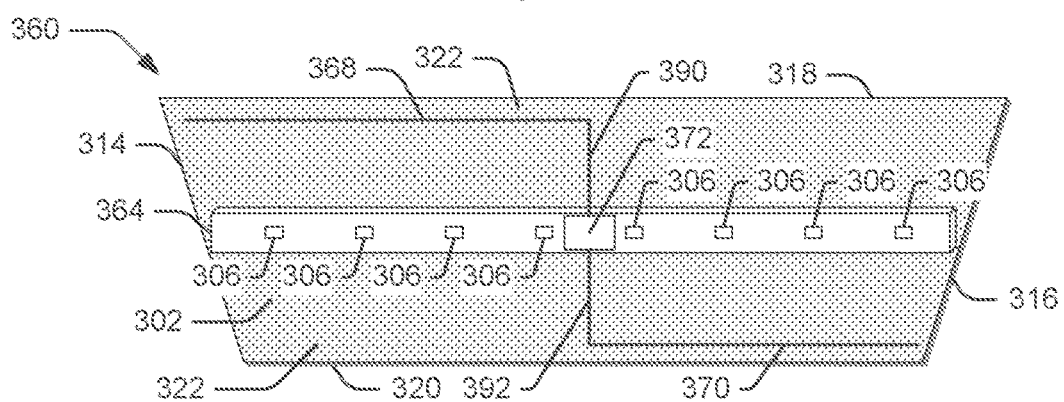

Referring to FIGS. 3A through 3C, there are shown embodiments of light fixtures 300, 330, 360 which represent various antenna and light source configurations. It is to be understood that the embodiments illustrated by FIGS. 3A through 3C are presented by example and the configurations of the light fixtures are not limited to those presented.

Each light fixture 300, 330, 360 includes a light fixture housing 302 and a lamp 304, 334, 364 supported by the light fixture housing. The lamp 304, 334, 364 has an elongated structure and includes multiple semiconductor light sources 306. For some embodiments, the lamp 304, 334, 364 has a substantially elongated dimension relative to other dimensions of the lamp. For example, as illustrated in FIGS. 3A-3C, the lamp 304, 334, 364 may have a length extending for most of the length of the light fixture 300, 330, 360 and a width that is much shorter that the width of the light fixture. Thus, the length of the lamp 304, 334, 364 is that is substantially greater than its width (and/or depth). The semiconductor light sources 306 are positioned substantially along a linear dimension such that they are in substantial alignment with each other. The lamp 304 is a region of the light fixture 300, 330, 360 that includes one or more light sources to emit light when connected to a power source. Examples of the light sources include, but are not limited to, semiconductor light sources (such as light emitting diodes), bulbs (such as fluorescent bulbs, incandescent bulbs, and halogen bulbs), and the like.

Multiple antennas 308, 310, 338, 340, 368, 370 are supported by each light fixture 300, 330, 360 and coupled directly or indirectly (such as via 390 & 392) to a sensor component 312, 342, 372. Among the multiple antennas, a first antenna 308, 338, 368 is directed toward a first end 314 of the light fixture housing 302, 332, 362 and a second antenna 310, 340, 370 is directed toward a second end 316 of the light fixture housing. For some embodiments, the first and second ends 314, 316 of the light fixture housing 302, 332, 36, are located at opposing sides of the light fixture housing.

The sensor component 312, 342, 372 is supported by the light fixture housing 302 and coupled to the multiple semiconductor light sources 306. For some embodiments, the sensor component is positioned at a central portion of the light fixture 300, 330, 360 and two or more antennas are directed in opposing directions away from the central portion. The central portion of the light fixture 300, 330, 360 may be identified by an area substantially equidistant from the first end 314 and the second end 316 of the light fixture housing 302, 332, 362. For some embodiments, the central portion of the light fixture 300, 330, 360 may be further identified by an area substantially equidistant from third and fourth ends 318, 320 of the light fixture housing 302, 332, 362 in which the fourth end 320 is opposite the third end 318. The sensor component 312, 342, 372 processes radio frequency (RF) signals received by the antennas 308, 310, 338, 340, 368, 370 from a remote device.

Each light fixture 300, 330, 360 may further include one or more reflectors 318 positioned adjacent to the lamp 304, 334, 364. A reflector 322 includes a reflective surfaces to direct or spread light from the lamp to a surrounding environment. For example, a parabolic reflector may focus light toward a particular location, and an elliptical reflector may spread light across a wider region.

Each light fixture 300, 330, 360 may further include a cover or lens 324 that is made of a transparent or translucent material to direct or diffuse light and/or provide protection for the lamp. In addition, the cover or lens may enhance the aesthetics of the light fixture by covering one or more antennas as well as other components may be removed from sight by building occupants proximal to the light fixture. It should be noted that the functionality of other components of the sensor component 312, 342, 372 may need to be considered for the placement and/or composition of the cover or lens 324. For example, a motion sensor of the sensor component 312, 342, 372 may require either a transmissible portion for the motion sensing technology or be offset to the positioned outside or otherwise beyond the boundaries of the cover or lens 324.

Referring specifically to FIG. 3A, there is shown a first embodiment of a light fixture 300 which represent an antenna and light source configuration positioned and affixed at a middle portion of the light fixture. The RF performance of this configuration is maximized by positioning the first antenna 308 and the second antenna 310 distal from each other. In particular, the first antenna 308 is directed toward the first end 314 of the light fixture housing 302 and the second antenna 310 is directed toward the second end 316 of the light fixture housing. The first and second antennas 308, 310 are positioned within a periphery of the lamp 304 and substantially parallel to the light sources 306, for example semiconductor light sources. Accordingly, the first and second antennas 308, 310 are directed in opposing directions to each other, relative to the coupled sensor component 312, and take advantage of the elongated length of the light fixture. In addition, the aesthetic character of this configuration is enhanced by positioning the first and second antennas 308, 310 adjacent to the linearly aligned light sources 306. Thus, the first and second antennas 308, 310 blend with the light sources 306 and other components at the middle portion of the light fixture 300, particularly when the light sources are inactive, and the antennas are further "hidden" from view by the illumination when the light sources are active. The first and second antennas may be further removed from view by the cover or lens 324 described above.

Referring to FIG. 3B, there is shown a second embodiment of a light fixture 330 which represent an antenna and light source configuration positioned and removably connected at the middle portion of the light fixture. For the second embodiment, the elongated lamp 334 may be removably connected to the light fixture housing 302. Examples of the illumination technologies that may be used for the elongated lamp 334 include, but are not limited to, an incandescent, a fluorescent, a halogen, semiconductor (such as light emitting diodes), and the like. The elongated lamps 334 may be replaced with similar illumination technologies for maintenance or with different illumination technologies to upgrade or otherwise change illumination or the cost thereof. Accordingly, the middle portion of the light fixture 330 may include female connectors 356 to removably couple to male connectors 358 of the lamp 314, or vice versa.

The connectors 356, 358 provide a mechanism for opposing ends of the lamp 334 to attachment to, and detachment from, the light fixture 360. For example, a lamp including multiple semiconductor light sources may have a fluorescent bulb form factor, such as a T5, T8, or T12, with the requisite base pins for a fluorescent lamp holder. For this example, the lamp may include light emitting diodes, multiple antennas, and a corresponding sensor component/circuit mounted to a circuit board that is positioned within the bulb form factor. Staying within the confines of the bulb form factor, the first antenna 338 is directed toward the first end 314 of the light fixture housing 302 and the second antenna 340 is directed toward the second end 316 of the light fixture housing. Also, the first and second antennas 338, 340 are positioned within a periphery of the lamp 334, substantially parallel to the light sources 306, and directed in opposing directions to each other relative to the coupled sensor component 342, to take advantage of the elongated length of the lamp 334. The aesthetic character of this configuration is enhanced by positioning the first and second antennas 338, 340 adjacent to the linearly aligned light sources 306, all within the bulb form factor. Thus, the first and second antennas 338, 340 are "hidden" from view similar to the first embodiment of FIG. 3A and have the further advantage of being obscured by the outer surface of the removably connectable form factor. For some embodiments, removably connectable form factor may provide support for other components of the lamp 334, such as other communication and motion detection components.

Referring to FIG. 3C, there is shown a third embodiment of a light fixture 360 which represent a light source configuration positioned and affixed at a middle portion of the light fixture and an antenna configuration positioned at outer regions of the light fixture. For some embodiments, such at the third embodiment, the antennas 368, 370, 390, 392 may extend from the sensor component 372 and be positioned beyond a periphery of the lamp 364. At least a portion of each antenna 368, 370 may be substantially parallel to the semiconductor light sources 306 of the lamp 364. As stated above, each light fixture 300, 330, 360 may include one or more reflectors 322 positioned adjacent to the lamp 364. For some embodiments, the antennas 368, 370, 390, 392 are positioned substantially in one or more reflectors 322 beyond a periphery of the lamp 364. As such, each light fixture 360 includes multiple antennas 368, 370, 390, 392 that are configured or positioned distal from each other at certain areas of the light fixture 360.

Figure 4:
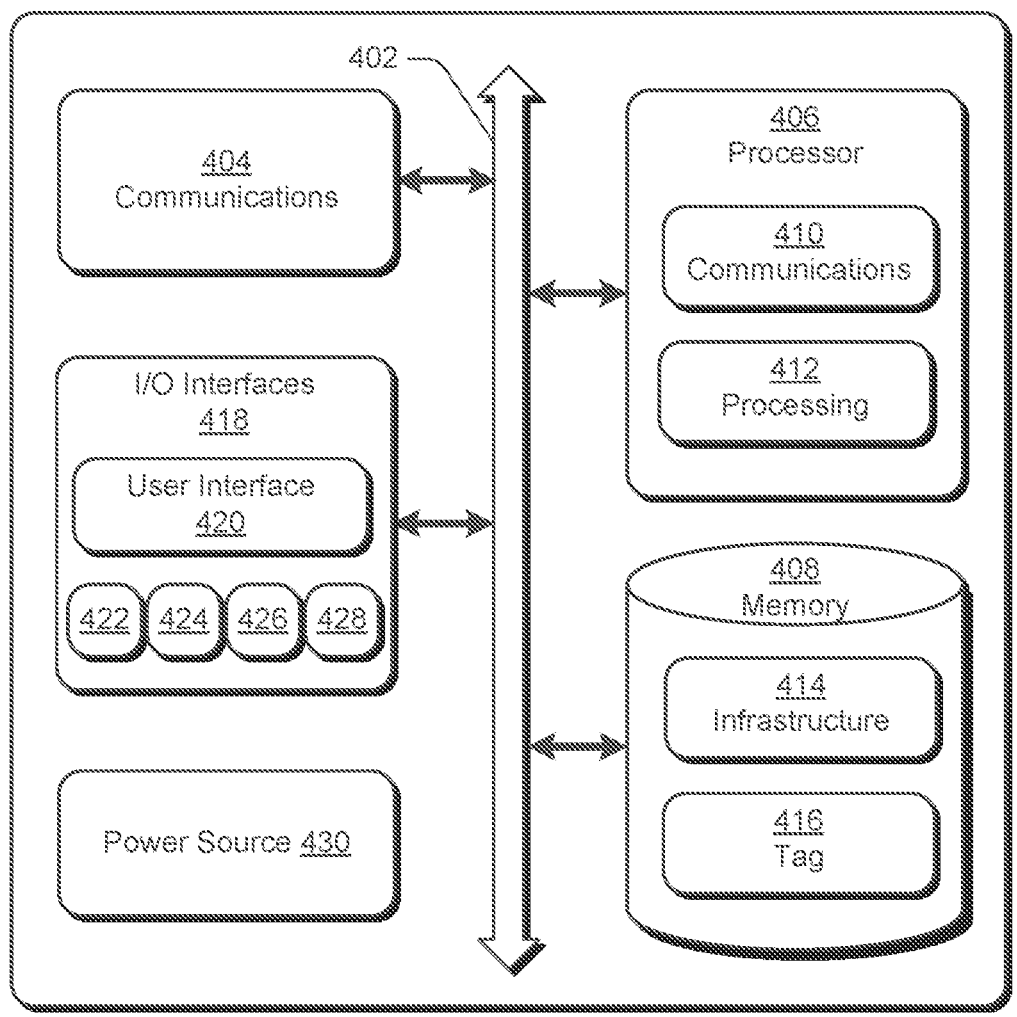
FIG. 4 is a block diagram of an example implementation of a sensor device or sensor component of a light fixture of FIG. 1.
Figure 4:
Figure 4:

FIG. 4 represents example device components 400 of a sensor, such as a sensor device or a sensor component 312, 342, 372, of a light fixture of the system 100 for communicating with mobile tags. As described above, each sensor of the building automation system 100 includes a communication component for receiving a broadcast beacon from a mobile tag associated with a person or other type of asset and one or more processors, i.e., a sensor, for processing the received broadcast beacon. Thus, each light fixture includes multiple antennas that are configured or positioned distal from each other at certain areas of the light fixture. The device components 400 of the sensor comprise a communication bus 402 for interconnecting the other device components directly or indirectly, one or more communication components 404 communicating with other entities via a wired or wireless network, one or more processors 406, and one or more memory components 408.

The communication component 404 is configured to receive beacons from mobile tags and provide data based on received beacons to one or more infrastructure devices, such as the sensor hub 112 or gateway 114. The communication component 404 may utilize wireless technology for communication, such as, but are not limited to, ultrawide band (MB), Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology. For some embodiments, the communication component 404 of the device components 400 may also utilize wired technology for communication, such transmission of data over a physical conduit, e.g., an electrical cable or optical fiber cable.

The processor 406 may execute code and process data received other components of the device components 400, such as information received at the communication component 404 or stored at the memory component 408. The code associated with the system 100 and stored by the memory component 408 may include, but is not limited to, operating systems, applications, modules, drivers, and the like. An operating system includes executable code that controls basic functions of the sensor, such as interactions among the various components of the device components 400, communication with external devices via the communication component 404, and storage and retrieval of code and data to and from the memory component 408.

Each application includes executable code to provide specific functionality for the processor 406 and/or remaining components of the sensor. Examples of applications executable by the processor 406 include, but are not limited to, a communications module 410 to manage wireless communications with the mobile tag and the infrastructure devices, and a processing module 412 to process the incoming signals of the multiple antennas (such as the first and second antenna) and provide the necessary data based on the incoming signals to the infrastructure devices. Although mobile tag characteristics based on angle of arrival, time of flight, or other location determination techniques may be determined by an infrastructure device, the sensor may provide such determinations using the processing module 412 of the processor 406 for some embodiments and the sensor may share processing responsibilities with one or more infrastructure devices for other embodiments.

Data stored at the memory component 408 is information that may be referenced and/or manipulated by an operating system or application for performing functions of the sensor. Examples of data associated with the system 100 and stored by the memory component 408 may include, but are not limited to, infrastructure data 414 to track addressing and protocols for communications with infrastructure devices and mobile tag data 416 to track addressing and protocols for communications with mobile tags.

The device components 400 of each sensor may include one or more input and/or output components, i.e., I/O interfaces 418. The I/O interfaces 418 of the device components 400 may include one or more visual, audio, mechanical, and/or other components. For some embodiments, the I/O interfaces 418 of each sensor may include a user interface 420 for interaction with a user of the device. The user interface 420 may include a combination of hardware and software to provide a user with a desired user experience. In addition to the wireless communications associated with the antennas, each sensor may further include other sensors such as a motion sensor 422, light sensor 424, temperature sensor 426, or other types of sensors 428, such as a humidity sensor, pressure sensor, air quality sensor, and the like.

The device components 400 may further comprise a power source 430, such as a power supply or a portable battery, for providing power to the other device components 400 of each sensor of the system 100.

It is to be understood that FIG. 4 is provided for illustrative purposes only to represent examples of the device components 400 of a sensor and is not intended to be a complete diagram of the various components that may be utilized by the device. Therefore, sensor may include various other components not shown in FIG. 4, may include a combination of two or more components, or a division of a particular component into two or more separate components, and still be within the scope of the present invention.

Figure 5:
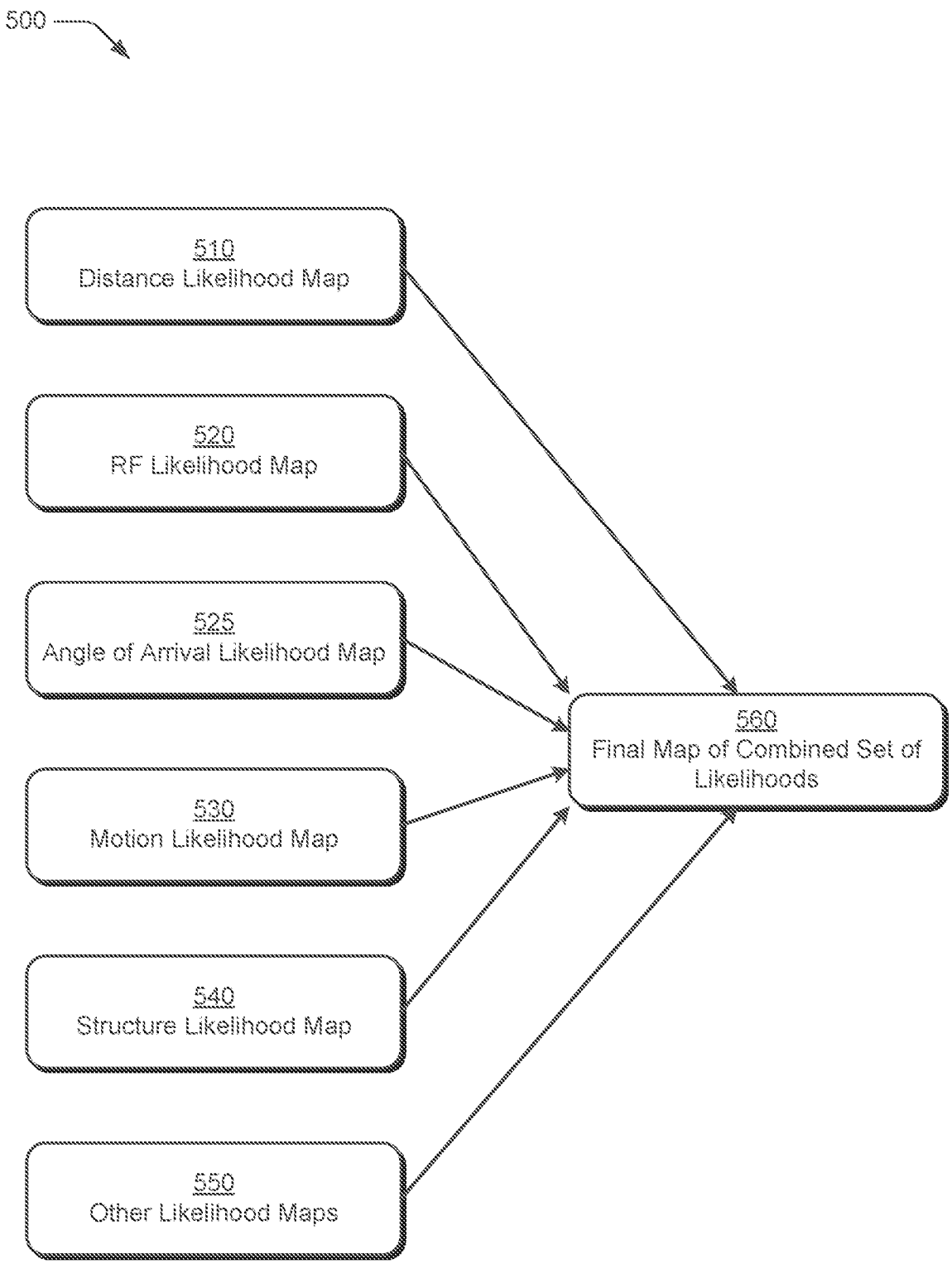
FIG. 5 is a diagrammatic view illustrating a technique for combining two or more likelihood maps for the purpose of determining a location of a mobile tag within a structure in accordance with the present invention.

Referring to FIG. 5, there is illustrated a technique 500 of a location determining system for combining multiple likelihood maps for the purpose of determining a location of a mobile tag within a structure, particularly an indoor structure or an outdoor structure without a positioning system (such as a global positioning system). The technique 500 determines the location of a mobile tag by generating multiple different likelihood maps and combining them to maximize the likelihood of identifying the true location of the mobile tag. Each likelihood map utilizes independent approaches for determining the location of the mobile tag, and the likelihood maps are combined to determine the best location. One example of a likelihood map is a distance likelihood map 510 representing possible paths of the mobile tag and probabilities of the mobile tag taking the possible paths. Another example is a radio frequency ("RF") likelihood map 520 in which multiple RF sensors are distributed throughout one or more areas of the structure and detect RF beacons transmitted by the mobile tag. Yet another example is an angle of arrival (AOA) likelihood map 525 in which, similar to the RF likelihood map, the system receives RF beacons from the mobile tag, but the location of the mobile tag is determined or modified based on a differential of RF signals. With reference to the RF likelihood map 520 and the Angle of Arrival likelihood map 525, examples of RF signals include, but is not limited to, a received signal phase to correlate angle or received signal strength indicator (RSSI) to correlate distance. Still another example is a motion likelihood map 530 in which multiple motion sensors are distributed throughout one or more areas of the structure and detect movement in proximity to each sensor. Still yet another example is a structure likelihood map 540 in which the likelihood of a mobile tag's position or movement is based on the location of boundaries and passages within the structure. Other likelihood maps 550, for example distance maps based on acoustic sensors, may be combined with the angle of arrival likelihood map 525 and/or one or more of the other likelihood maps to determine the most likely location of the mobile tag within the structure.

Figure 6A:
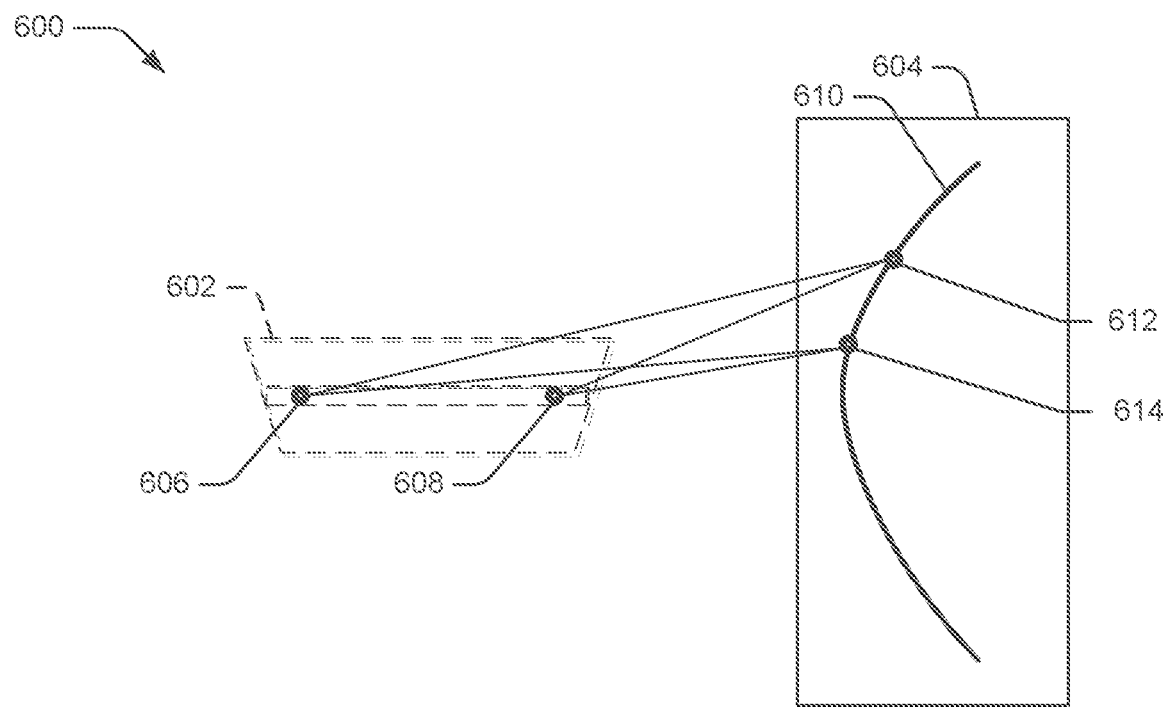
FIG. 6A is a schematic diagram illustrating development of an angle of arrival likelihood map in accordance with the present invention.

Referring to FIG. 6A, there is shown a diagram 600 illustrating an association between a lighting fixture 602 and an angle of arrival map 604 or, more particularly, antenna readings at first and second antennas 606, 608 of the light fixture and an angle of arrival curve 610 of the angle of arrival map. For the angle of arrival map 604, the phase changes over the antenna array, including the first antenna 606 and the second antenna 608, are determined by the incoming angle to the array. The phase changes are used to calculate distances 612, 614 from the first and second antennas 606, 608 and determine the angle of arrival curve 610 based on the multitude of calculated distances. The angle of arrival measures the difference in received phase for each element of the antenna array. The received signal has a different phase when arriving at the multiple antennas, i.e., the first and second antennas. The distance between the antennas is fixed and known to the receive. Based on the difference between the phases of the received signal at each antenna, the receiver may estimate the direction of the tracked device based on the phase difference in order to determine the location of the mobile tag.

Figure 6B:
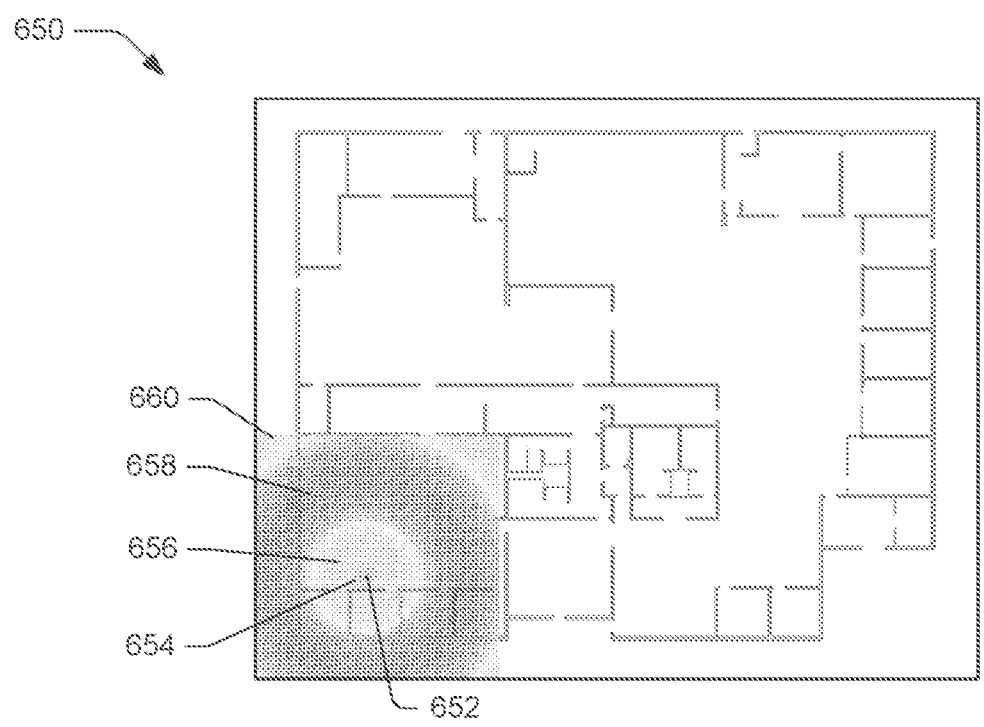
FIG. 6B is a planar schematic diagram of an example likelihood map in accordance with the present invention.

FIG. 6B is a schematic diagram of an example likelihood map 650 in accordance with the present invention. Each likelihood map 510-550 represented by FIG. 5 represents a location probability of the mobile tag based on varying techniques. By combining angle of arrival maps based on measurements from multiple lighting fixtures, the angle of arrival likelihood map 525 may be developed, as represented in the abstract by the example likelihood map 650. Likewise, each of the other likelihood maps 510, 520, 530, 540, 550 based on other techniques, such as distance, RF, motion, structure and other techniques, also represented in the abstract by the example of likelihood map 650.

As shown in FIG. 6B, each of these likelihood maps may include a center 652 and multiple concentric rings 654-660 located about the center, each representing different likelihoods of a determined location for the mobile tag within an area. The location determining system generates a set of likelihoods of the mobile tag being located at each second location of these multiple second locations. The first concentric ring 654 represents the area of the structure having the highest likelihood of representing the location of the mobile tag, based on the likelihood map 650. The second concentric ring 656 represents the area of the structure having the second highest likelihood of representing the location of the mobile tag. The third concentric ring 658 represents the area having the third highest likelihood, and the surrounding area 660 beyond the third concentric ring represents the least likelihood of representing the location of the mobile tag.

Figure 7:
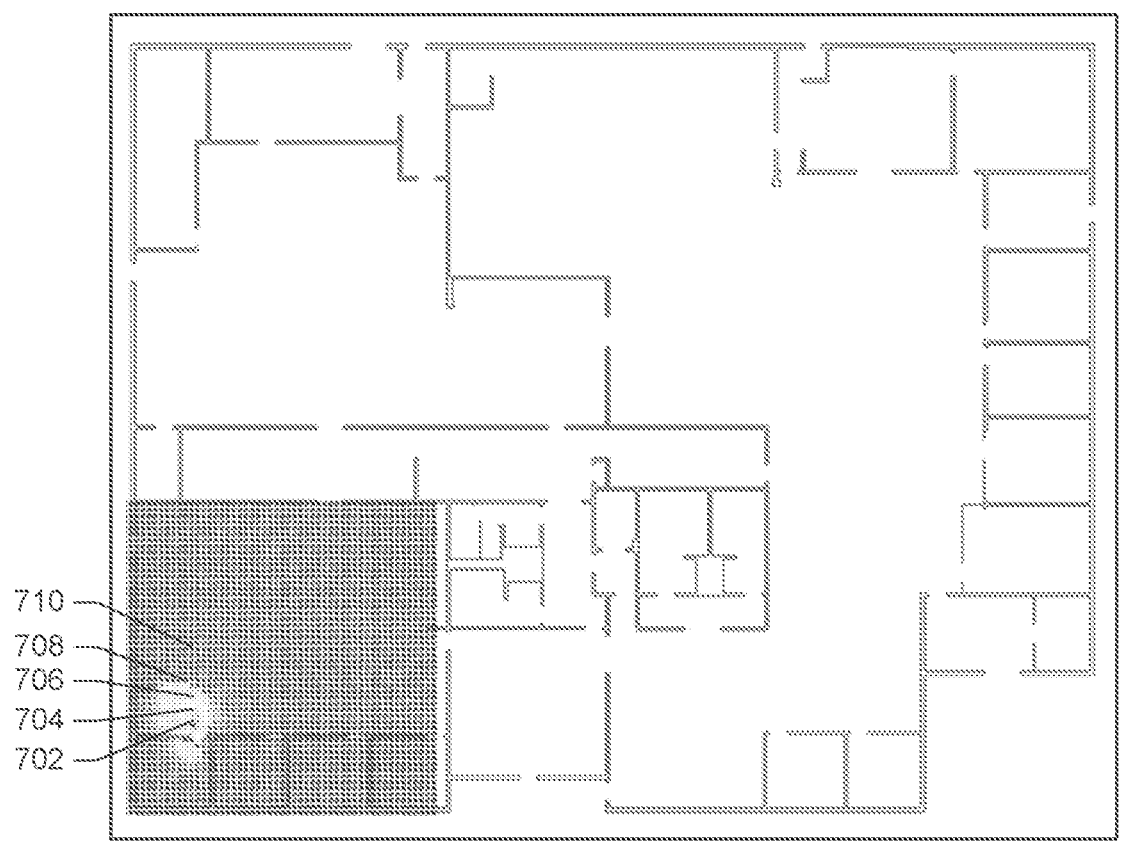
FIG. 7 is a planar schematic diagram of an example final likelihood map, based on a combined set of likelihoods, in accordance with the present invention.

Referring to FIG. 7, there is shown an example final likelihood map 700 based on a combined set of likelihoods. The location determining system, or more particularly the controller of the location determining system, may generate a combined set of likelihoods based on the first set of weighted likelihoods and the second set of weighted likelihoods. The system and/or controller may determine the location of the mobile tag within the structure based on the combined set of likelihoods. The first set of weighted likelihoods and the second set of weighted likelihoods may include, but are not limited to, an angle of arrival likelihood map, a distance likelihood map, a radio frequency ("RF") likelihood map, a motion likelihood map, a structure likelihood map, and/or other likelihood maps.

The final likelihood map 700 includes one or more first final areas 702 of the structure having the highest likelihood of representing the location of the mobile tag, based on the final likelihood map. The final likelihood map 700 may also include one or more second final areas 704 having the second highest likelihood, one or more third final areas 706 having the third highest likelihood, and one or more fourth final areas 708 having the fourth highest likelihood. The final likelihood map 700 may further include one or more surrounding final areas 710 having less likelihood of representing the location of the mobile tag than the first, second, third or fourth final areas 702-708.

To combine likelihood maps, the location determining system may stack multiple likelihood grids. For example, all matching points of the likelihood grids may be multiplied together. Other ways of combining the data exist including using addition and a Bayesian method. For example, likelihood maps may be combined by the location determining system by multiplying each grid point for the distance, radio frequency, motion, and/or structure. The area under the surface is then normalized to one, and the sum of all resulting grid points would be one. The more likelihood maps that are combined by the location determining system, the closer the determined location will be to the true location of the mobile tag. After the location determining system determines the final likelihood map 700, the map may be fed to an optimal estimator, such as a Kalman filter, for further refinement.

Figure 8:
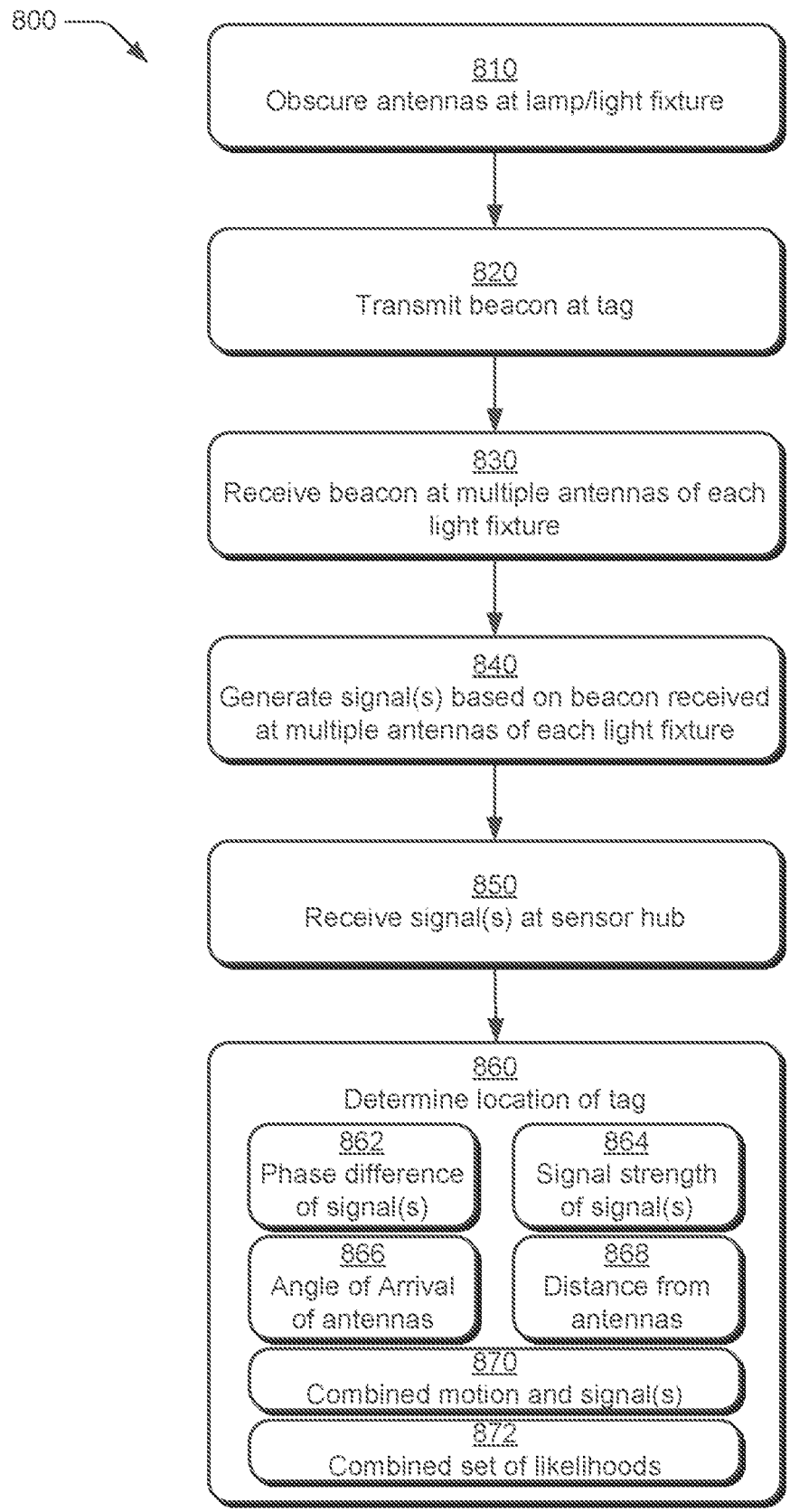
FIG. 8 is a flow diagram representing an example operation of the location determining system in accordance with the present invention.

FIG. 8 illustrates an example operation of the location determining system. Each lamp or light fixture of the building automation system includes two or more antennas that are obscured (810). The antennas may be obscured by an active state of the lamp of the light fixtures. For example, when the semiconductor light sources are illuminated during their active state, a proximal person would not be able to see the antennas due to the brightness of the illumination or avoid looking in the direction of the illumination to avoid any discomfort that may be caused by the glare. As another example, the antennas may be obscured by a portion of the light fixture housing such as hiding under the housing portion, hiding under a lamp or light fixture cover, or positioning within a subtle seam of the lamp or light fixture.

After obscuring the multiple antennas for each lamp or light fixture (810), a mobile tag transmits a broadcast beacon based on RF technology (820). The sensor device of each light fixture may receive the broadcast beacon at two or more antennas coupled to a sensor component of the device (830). The sensor devices are co-located with the light fixtures such that each device corresponds to a particular light fixture. As explained above, multiple antennas are included by each sensor device in which the antennas are distal from each other (such as opposing sides of the device) in order to enhance the location determination function. Each of the mobile tag, sensor device, and/or sensor component includes a communication component may utilize an RF technology such as, but not limited to, ultrawide band (UWB), Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology.

The sensor device or component generates at least one signal associated with the broadcast beacon received at the multiple antennas of each light fixture (840) in response to receiving the broadcast beacon at the antennas (830). For some embodiments, the signal or signals generated by the device or component may be utilized by the device or component to perform location determination of the mobile tag. For other embodiments, the signal or signal generated by the device or component is transmitted to an upstream device, whether remote or part of the infrastructure, such as the sensor hub 112 or the gateways 114, for processing and location determination of the mobile tag. For the above embodiments, signals are collected by the upstream device from multiple sensor devices or components in order to determine an accurate location.

The upstream device, upstream from the sensor devices, such as the sensor hub, receives the signal or signals from each sensor device (850). The upstream device determines a location of the mobile tag based on the signal or signals (860). For some embodiments, the upstream device determines the location based on a phase difference of RF signals of the signal(s) (862). For example, the phase difference of the antenna may correspond to an angle of arrival. For some embodiments, the upstream device determines the location based on an RF signal strength of the signal(s) (864). For example, the strength of an RSSI may correlate to a distance for determining a location. For some embodiments, the upstream device determines the location based on one or more angles of arrival of the antennas (866). For example, the angle of arrival may be combined from multiple antennas to achieve location determination. Likewise, the signal strength may be combined from multiple antennas to achieve location determination. For some embodiments, the upstream device determines the location based on one or more distances of a probable location from the antennas (868).

The upstream device, such as the sensor hub, may also combine the signal or signals generated based on the broadcast beacon received from multiple antennas of each light fixture, with other data. For some embodiments, the upstream device may determine the location of a mobile tag based on a signal generated by another sensor, such as a motion sensor 422, light sensor 424, temperature sensor 426, humidity sensor, pressure sensor, air quality sensor, and the like, as well as the generated signal. For example, a motion signal generated by the motion sensor may be combined with the generated signal in order to refine, by precision or accuracy, the possible locations for the mobile tag. For some embodiments, the upstream device may determine the location based on a first set of likelihoods associated with RF signals received by the antennas of each sensor and a second set of likelihoods that is not associated with RF signals received by the antennas of each sensor. For example, as shown in FIG. 5, likelihoods associated with RF signals include RF likelihood and Angle of Arrival likelihood while likelihoods not associated with RF signals include distance likelihood, motion likelihood, and structure likelihood.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A light fixture comprising:
a light fixture housing including a central portion and opposing ends;
a lamp supported by the light fixture housing, the lamp including a plurality of semiconductor light sources positioned along a linear dimension toward opposing sides of the light fixture housing;
a plurality of antennas supported by the light fixture housing, the plurality of antennas extending from the central portion of the light fixture housing toward the opposing ends of the light fixture housing in parallel to the plurality of semiconductor light sources; and
a sensor component coupled to the plurality of antennas, the sensor component processing RF signals received from a remote device by the plurality of antennas.

2. The light fixture as described in claim 1, wherein: the plurality of antennas are positioned within a periphery of the lamp.

3. The light fixture as described in claim 1, wherein the plurality of antennas are obscured due to at least one of an active state of the plurality of semiconductor light sources or a portion of the light fixture housing.

* * * * *